United States Patent
Greene et al.

(10) Patent No.: US 11,479,489 B1
(45) Date of Patent: Oct. 25, 2022

(54) GROUND WATER CONTAMINATION REMEDIATION USING A MAN-MADE SURFACE WATER FEATURE

(71) Applicant: Pure Muskegon Development Company, LLC, Spring Lake, MI (US)

(72) Inventors: Daniel G. Greene, Ada, MI (US); David C. Bos, Spring Lake, MI (US); James Reminga, Jr., Grand Rapids, MI (US)

(73) Assignee: Pure Muskegon Development Company, LLC, Spring Lake, MI (US)

( * ) Notice: Subject to any disclaimer, the term of this patent is extended or adjusted under 35 U.S.C. 154(b) by 0 days.

(21) Appl. No.: 17/730,341

(22) Filed: Apr. 27, 2022

(51) Int. Cl.
*C02F 7/00* (2006.01)
*C02F 1/28* (2006.01)
(Continued)

(52) U.S. Cl.
CPC ............... *C02F 7/00* (2013.01); *B09C 1/002* (2013.01); *C02F 1/281* (2013.01); *C02F 1/583* (2013.01);
(Continued)

(58) Field of Classification Search
CPC ............ B09C 1/002; C02F 7/00; C02F 1/281; C02F 1/283; C02F 1/288; C02F 1/583
(Continued)

(56) References Cited

U.S. PATENT DOCUMENTS

| 5,362,394 A * | 11/1994 | Blowes ................... B09C 1/002 |
| | | 210/720 |
| 11,027,988 B2 | 6/2021 | Nickelsen et al. |
| 2013/0233809 A1 | 9/2013 | Graham et al. |
| 2020/0197903 A1 | 6/2020 | Turner |

(Continued)

FOREIGN PATENT DOCUMENTS

| EP | 2207633 | 5/2016 | |
| WO | WO-2019068289 A1 * | 4/2019 | .............. C02F 1/283 |

(Continued)

OTHER PUBLICATIONS

Rembind, Inc.; "Aquagate RemBind for Surface and Ground Water Remediation", Internet Publication; https://rembind.com/; pp. 1-14.
(Continued)

*Primary Examiner* — Claire A Norris
(74) *Attorney, Agent, or Firm* — Frank M. Scutch, III

(57) ABSTRACT

A ground water contamination remediation process includes the steps of identifying a source and location of land-based ground water contamination and excavating the soil above and within the location of the contamination to create a void. The width and depth of the void is increased to a predetermined size until the contaminated ground water is exposed creating a man-made treatment lake by allowing the contaminated ground water to partially fill the void. In one embodiment, the water in the treatment lake is aerated to reduce the amounts of hydrogen sulfide, methane, and biodegradable compounds in the contaminated water. In another embodiment, an adsorbent material is added to the (Continued)

treatment lake so to isolate per- and poly-fluoroalkyl substances (PFAS). The adsorbent material is applied to or mixed into PFAS contaminated water, PFAS is adsorbed, and the solid adsorbent materials settle to the bottom of the lake for subsequent management or removal.

17 Claims, 4 Drawing Sheets

(51) Int. Cl.
*C02F 1/70* (2006.01)
*C02F 1/58* (2006.01)
*B09C 1/00* (2006.01)
*C02F 103/06* (2006.01)
*C02F 101/30* (2006.01)
*C02F 101/36* (2006.01)

(52) U.S. Cl.
CPC .......... *C02F 1/70* (2013.01); *C02F 2101/301* (2013.01); *C02F 2101/36* (2013.01); *C02F 2103/06* (2013.01)

(58) Field of Classification Search
USPC .................. 210/747.9, 128.1; 405/128.1
See application file for complete search history.

(56) References Cited

U.S. PATENT DOCUMENTS

| 2020/0222953 | A1 | 7/2020 | Morrell |
| 2021/0130201 | A1 | 5/2021 | Kerfoot |
| 2021/0171365 | A1 | 6/2021 | Nelson |
| 2021/0300789 | A1 | 9/2021 | Phillips |

FOREIGN PATENT DOCUMENTS

| WO | 2020168385 | 8/2020 |
| WO | 2020237291 | 12/2020 |
| WO | 2021042175 | 3/2021 |
| WO | 2021188493 | 9/2021 |

OTHER PUBLICATIONS

Envirnmental Show of the South; "Addressing PFAS Groundwater to Surface Water Discharge: Materials and Methods for Construction of In-Situ Permeable Reactive Barriers (PRB) to Limit Migration"; May 15, 2019; pp. 1-25.

Chowdhury Md, Saidul Azam et al; "The Use of an Aeration System to Prevent Thermal Stratification of Water Bodies: Pond, Lake and AeratWater Supply Reservoir." Applied Ecology and Environmental Sciences 2.1 (2014), pp. 1-14.

Simpkins, William, "Groundwater Flows In and Out Of Ames' Ada Hayden Lake"; New Services, Iowa State University; Jan. 2, 2007; pp. 1-3.

\* cited by examiner

GROUND WATER CONTAMINATION REMEDIATION USING A MAN-MADE SURFACE WATER FEATURE

FIELD OF THE INVENTION

The present invention relates generally to environmental clean-up processes and more particularly to a remedial method for removing contaminants from ground water.

BACKGROUND

Industrial real estate properties that have been used for many years often contain many environmental contaminants in their soil and ground water. These contaminants need to be cleaned-up to protect human health and the environment, to stop the migration of contaminated ground water off of the property, and before the property can be reused in either a residential or non-residential application. Environmental investigations often discover and document these types of environmental pollution that require action.

In many problematic areas, the results of soil, ground water, and soil vapor tests often identify dissolved gasses or the conditions that support the biological production of dissolved gasses including such gasses as methane and hydrogen sulfide in both ground water and soil. Additionally, per- and poly-fluoroalkyl substances (PFAS) are often found in ground water, soil, and sediment. Concentrations of these pollutants can be very high and often exceed levels that are allowable for residential and non-residential site use under laws, rules, statutes, and ordinances that are promulgated by federal, state and local authorities.

Those skilled in the art will recognize that methane, hydrogen sulfide, PFAS, and other contaminants pose potential risks to human health and the environment. Hazards, such as potential exposures and the potential spread, migration, acts of others, and the worsening of site conditions, must be addressed and mitigated as part of due care obligations in connection with redevelopment activities. Since ground water below a site can migrate and encounter water supply wells or can discharge into existing bodies of water, the releases of PFAS, and other compounds to soil and ground water can impose unacceptable environmental hazards. Aquatic organisms and ground water and surface-water drinking sources are particularly vulnerable to PFAS contamination. Houses and occupied structures are particularly vulnerable to vapor intrusion from methane, hydrogen sulfide, and volatile organic compounds (VOCs).

Several alternative environmental treatments have been used in the prior art. These prior art treatments are largely ineffective since conventional treatment methods for removing PFAS from the ground water, including liquid-phase granular activated charcoal (GAC), are most often unsuccessful due to the system requirements to capture contaminated water, high concentrations of interfering constituents, high costs related to system operation and the treatment or disposal of waste products, and the time required for meaningful remedial action. Interfering constituents can be sulfate, sulfite, sulfide, total organic carbon (TOC), tannins, lignins, humic acid (HA) compounds, dissolved metals, pH, and other man made compounds in the ground water. Moreover, biological production of hydrogen sulfide ($H_2S$) and methane in the ground water can be largely reduced and/or stopped and destruction of biodegradable compounds can be accomplished through processes that increase the concentration of dissolved oxygen in the ground water at a contamination site. Compounds in the ground water, while not present above health-based cleanup criteria, significantly increase the difficulty of applying conventional treatment methods. Pre-treatment of the interfering chemistry is also very expensive. Collectively, these factors often render ex-situ treatment of PFAS contamination economically impracticable. Although clean-up efforts using absorptive or filtering techniques can effectively reduce contaminant levels in ground water, these types of efforts most often lead to plugged filters or reduced effectiveness of adsorptive materials which substantially decrease the efficacy of these processes. As a result, the PFAS compounds can be difficult to capture and can exceed permitted drinking water limits, surface water limits, or discharge limits for municipal treatment facilities. Difficulties in operation of PFAS adsorptive and filtering systems can cause substantial increases in maintenance costs and decreased performance of the system, necessitating discontinuance of the system.

Accordingly, new processes are necessary to effectively remove ground water contaminants to improve environmental conditions and help improve water quality. Efforts are needed to support a revitalization of contaminated sites which will have an overall benefit to the environment, local communities, and local economies.

SUMMARY OF THE INVENTION

The present invention is directed to a process for remediating contaminated ground water comprising the steps of: identifying a location of land-based contaminated ground water; excavating a void to expose the contaminated ground water; allowing the water to fill the void to create a surface-water feature; and adding an adsorbent chemical to the treatment lake to isolate contamination and providing treated water containing a lower concentration of contaminant compounds. In one embodiment, the contamination are per- or poly-fluoroalkyl substances (PFAS) The adsorbent material is at least one of powered activated carbon (PAC), clay, metal oxide, or organoclay or more specifically REMBIND where the adsorbent material settles to the bottom of the treatment lake. Sand, silt, clay, gravel, stone, low permeability material, synthetic material, or other materials may be added to the treatment lake for isolating the contamination under the added material. In another embodiment, an air-water interface is created to allow the direct diffusion of dissolved gasses between the water and atmosphere. The concentration of dissolved oxygen in the surface-water feature may be increased through active or passive methods for reducing hydrogen sulfide and methane. The treated water in the surface-water feature is permitted to flow out of the surface-water feature by the process of natural ground water flow. In other embodiments, the contaminated ground water can be pumped from the ground into the treatment lake. Finally, treated water can also be pumped from the treatment lake where the treatment lake is connected to a natural body of water for allowing water to mix.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1A:
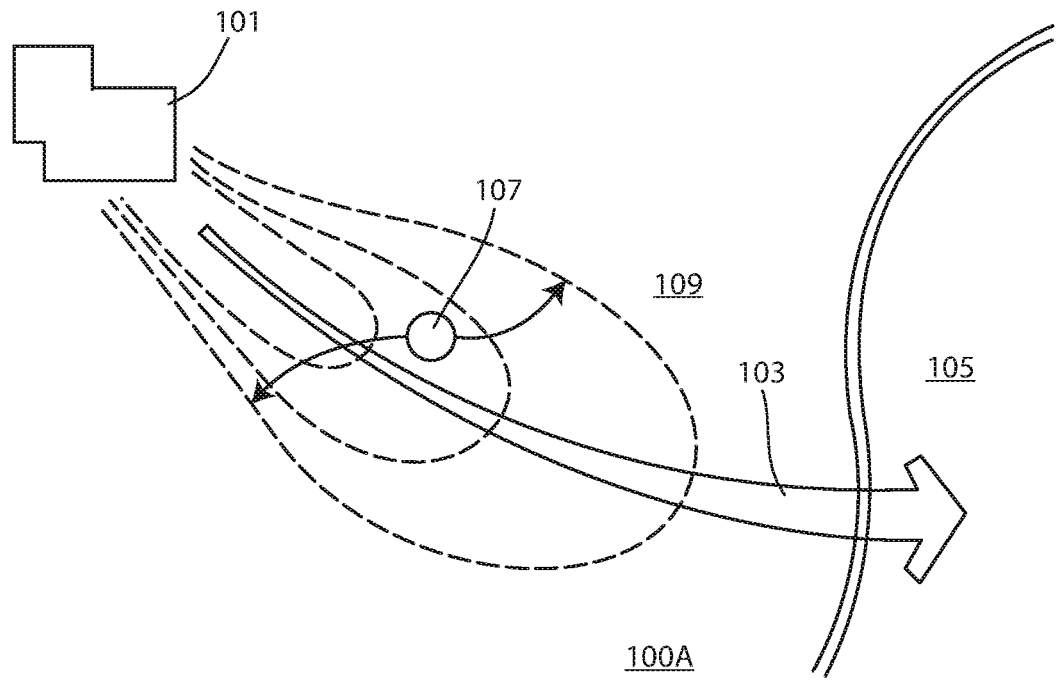
FIG. 1A and FIG. 1B are a top and sectional views respectively illustrating ground water contamination.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention. Additionally, the location, configuration, and quantities of some elements may be changed to meet site specific conditions or remediation goals.

DETAILED DESCRIPTION

Before describing in detail embodiments that are in accordance with the present invention, it should be observed that the embodiments reside primarily in combinations of method steps related to the remediation of ground water contamination. Accordingly, the method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

The present invention is a ground water remediation process that provides alternatives to conventional pump and treat methods to remediate water contaminants. The invention provides for the construction of a surface-water feature that provides an effective method for substantially accessing ground water, increasing the concentration of oxygen dissolved in the water, allowing diffusion of dissolved gasses out of the water, and reducing the presence of methane, hydrogen sulfide, and other biodegradable compounds. The concentration of oxygen dissolved in the water may be increased passively through contact with the atmosphere or actively through the use of aerators, air sparging, fine bubble diffusers, or a variety of similar methods. Constructing a surface water feature allows the application of adsorbent materials to the water to reduce the concentration and mobility of PFAS compounds and to produce purified water containing lower concentrations of methane, hydrogen sulfide, or PFAS. While it is not expected that the proposed remediation will eliminate all PFAS concentrations from the water, it is expected that the proposed remedial actions will reduce the dissolved mass of PFAS in the water, will reduce the mass of PFAS migrating in the water, will reduce the subsequent discharge of PFAS contaminated water to natural or existing surface waters, will reduced the migration of PFAS to water supply wells, and will reduced the bioaccumulation of PFAS in the food chain and the potential for human exposure through drinking water and fish consumption. Constructing the surface-water feature will result in the rapid removal of PFAS contaminated solids from the aquifer or water bearing zone, thereby reducing the amount of PFAS able to migrate in ground water. The contaminated solids excavated during the construction of the surface-water feature can be managed separately to reduce or prevent environmental exposure.

Figure 1B:
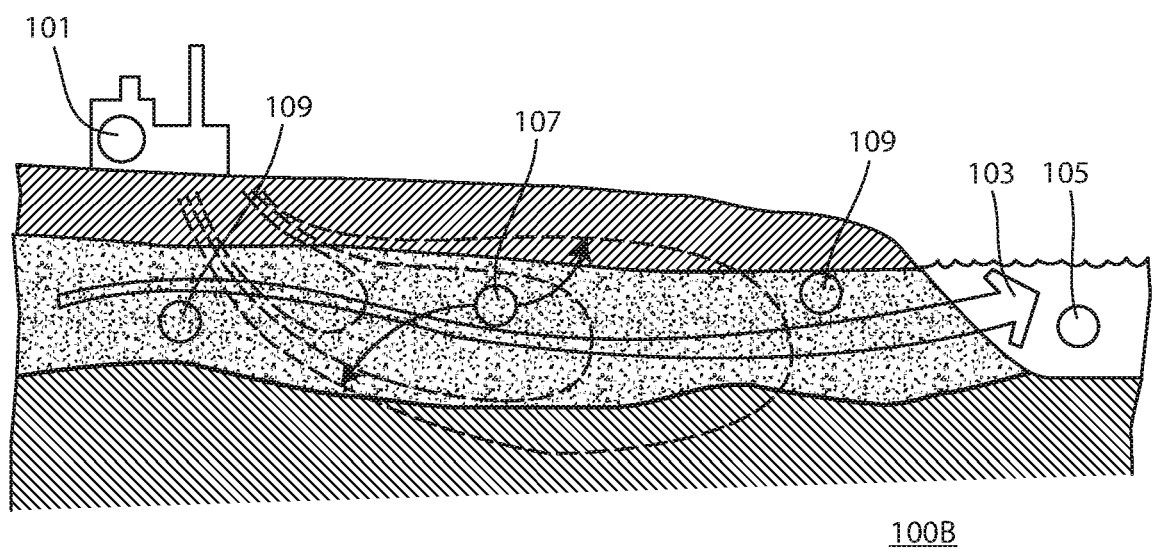

FIG. 1A and FIG. 1B are a top and sectional views respectively illustrating an example of a typical ground water contamination setting 100A, 100B. As seen in both FIGS. 1A and 1B, a source of ground water contamination and/or pollution might be in a factory building 101, or other older manufacturing type facility, or application location, or spill location where adherence to environmental protections and concerns over many years was not followed. Consequently, pollutants and/or environmental contaminants are discharged in the soil seeping into the ground water. Once in the ground water, the contaminants propagate away from their source in a ground water flow 103. Downstream of the water flow 103, other water sources such as rivers, lakes, streams, and aquifers 105 can also become contaminated. Additionally, a pollution plume 107 is also formed that works its way deeper into the soil where it eventually finds and contaminates the ground water 109.

Figure 2A:
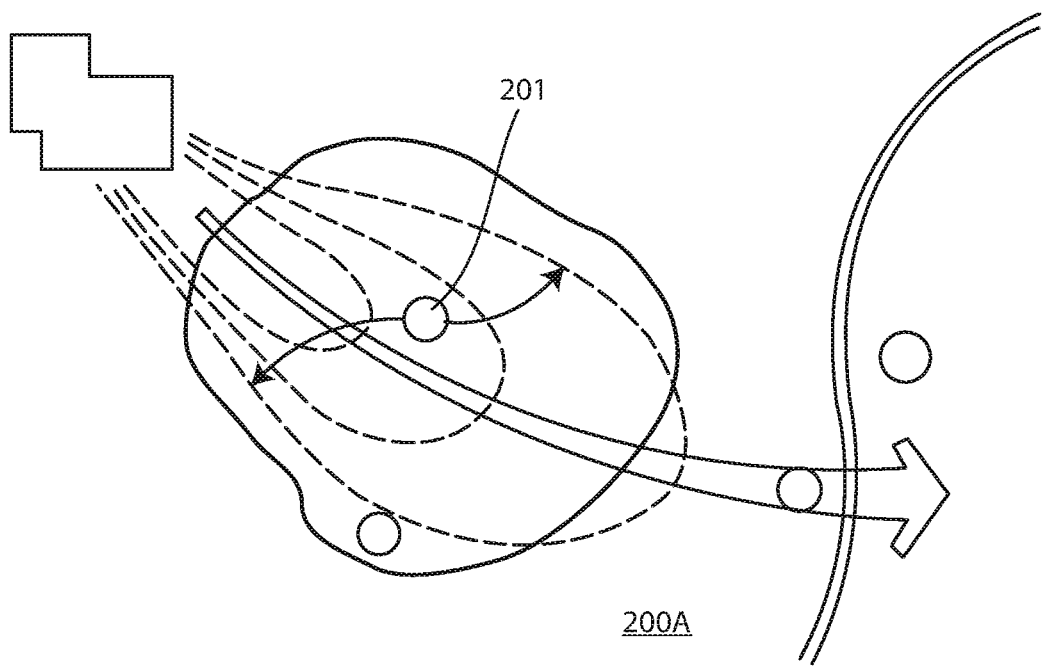
FIG. 2A and FIG. 2B are top and sectional views respectively illustrating the creation of a man-made treatment lake.
Figure 2B:
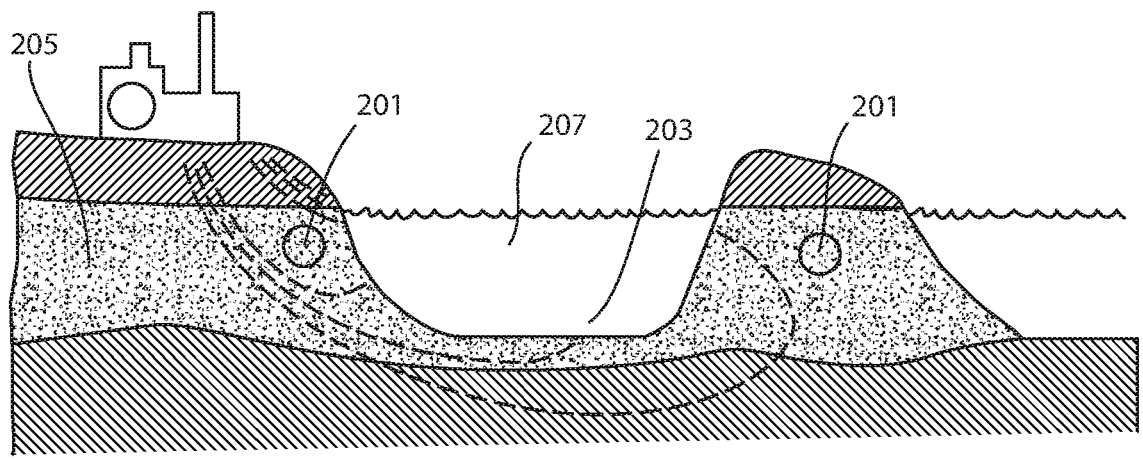

FIGS. 2A and 2B are top and sectional views respectively illustrating the creation of a man-made surface-water feature 200A, 200B. Once a source area, central location, or distal location of the pollution plume 201 is located and/or identified, the soil is removed and/or excavated at some predetermined location to create a void 203. The void 203 is sized so to allow contaminated ground water 205 to fill its interior, exposing the contaminated ground water to the atmosphere. This results in the creation of a man-made surface water feature 207. Although the man-made surface-water feature 207 is illustrated in FIGS. 2A and 2B as substantially circular, those skilled in the art will recognize that any size and shape is possible as long, wide, or deep as needed so that the ground water filling the excavated void is exposed.

Figure 3A:
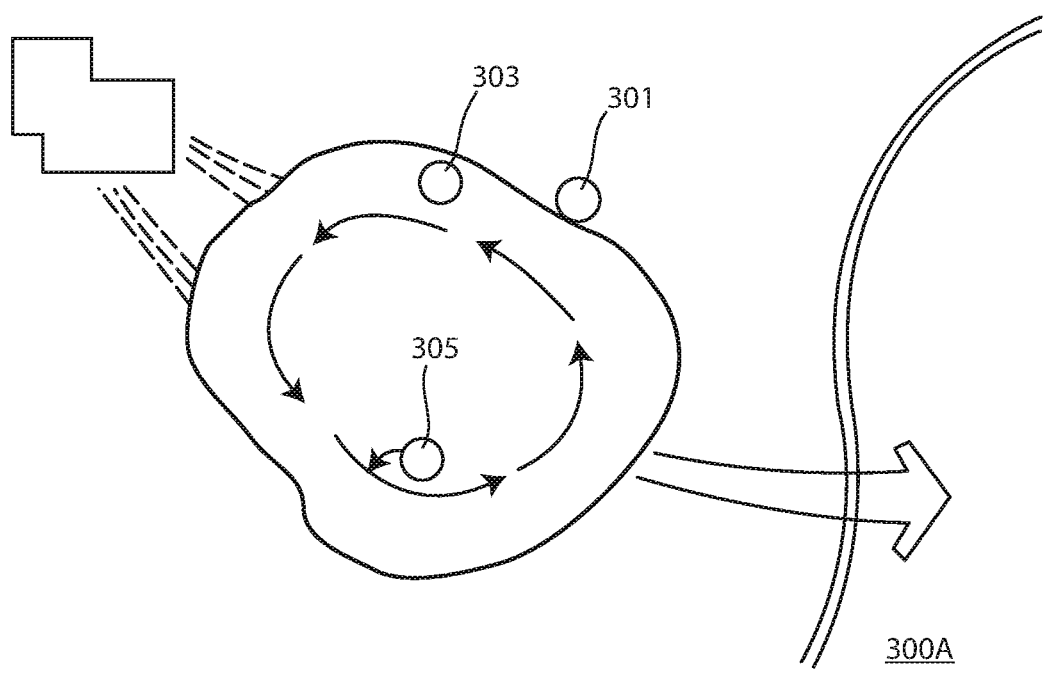
FIG. 3A and FIG. 3B are top and sectional views respectively illustrating treating of the contaminated ground water using an adsorbent material.
Figure 3B:
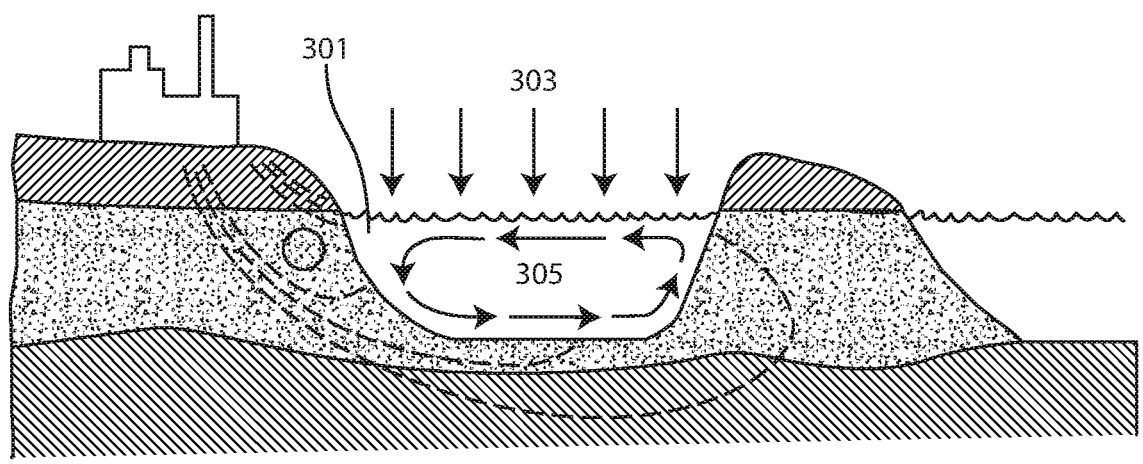

FIGS. 3A and 3B are top and sectional views respectively illustrating the treatment processes applied to the contaminated water that accumulates in the man-made surface-water feature. As seen in both FIGS. 3A and 3B, when the water 301 is exposed to open air, an adsorbent material 303 is applied to the water 301. The adsorbent material 303 may be a material such as REMBIND®, powdered activated carbon, clay minerals, organoclay, metal oxides, or other materials know by the practitioners of the art. REMBIND®, and adsorbent materials like it, are typically in the form of a powdered, dry, bulk solid.

Figure 4A:
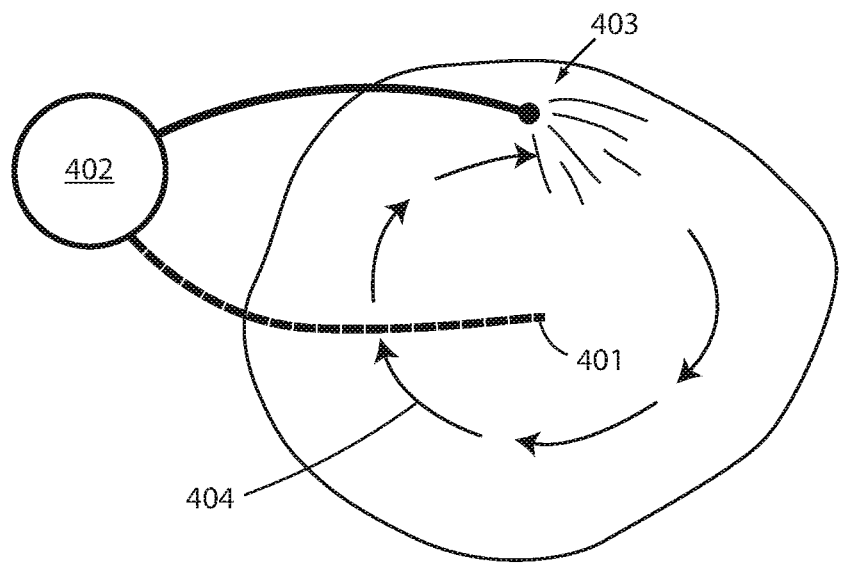
FIG. 4A and FIG. 4B are top and sectional views respectively illustrating the mixing and application of adsorbent material.
Figure 4B:
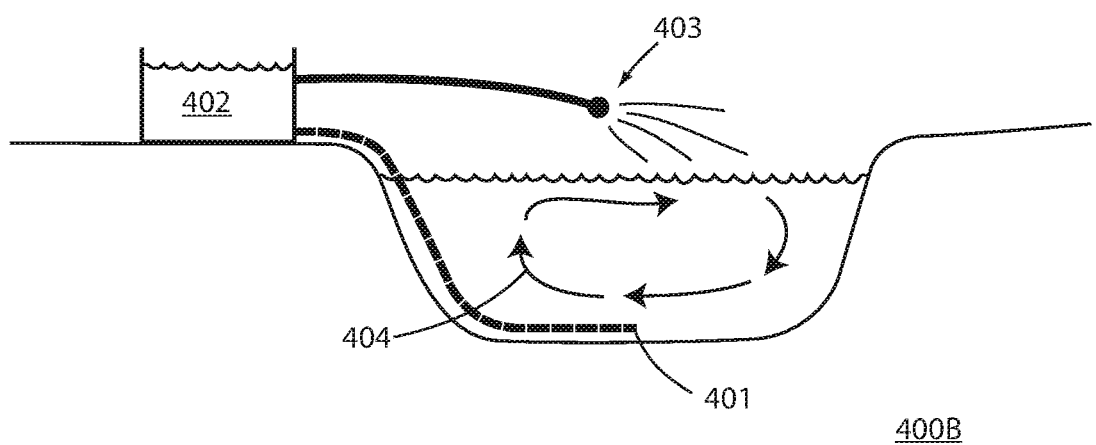

FIGS. 4A and 4B are top and sectional view respectively illustrating a method of mixing and applying adsorbent materials. In one such application, adsorbent material is added to a high velocity water stream or spray of water to achieve mixing. Pumping and stirring may be used to maintain suspension of the adsorbent material in the water. In another such application, adsorbent material is added to a mechanical mixer similar to the type used to wet, mix, and apply grass seed when planting lawns. Pumping and stirring may be used to maintain suspension of the adsorbent material in the water. Those skilled in the art will further recognize that many options, configurations, and combinations of equipment may be used to apply adsorbent materials. As seen on both FIGS. 4A and 4B, water 401 from the man-made water feature or other source, is directed to a mixing tank, vessel, or container 401 where adsorbent material is added and mixed to the water and then applied 403 to the man-made water feature, and mixed 404 with the contaminated water for the water feature. Addition of the adsorbent material may be added directly to the surface-water feature or indirectly to the surface water feature. Indirect application to the surface-water feature may be accomplished by first applying the adsorbent material in a mixing tank, in-line mixer, or other mechanical, air, or fluid-based mixing devise.

During the application of the adsorbent material, mixing may be accomplished using water withdrawn from the surface-water feature, ground water, or other water source. After predetermined amounts of the powdered adsorbent are added to the water, the water and adsorbent are mixed and/or blended 305, 404 with the contaminated water in the surface-water feature. This mixing/blending enables the adsorbent to spread throughout the surface-water feature to achieve the desired contact time between the contaminant and the adsorbent to allow adsorption of the PFAS contaminants in the water. Contact time between the contaminant and the adsorbent may be achieved, increased, or decreased as needed through the use of pumps, mixers, aerators, or other means to maintain suspension of the adsorbent in the water column of the surface-water feature. Once adsorption of the PFAS to adsorptive material has occurred, or while adsorption is occurring, or after the end of mixing of the surface water, the PFAS retained on attached to the adsorbent material will settle to the bottom of the surface-water feature under the influence of gravity. One or more applications of adsorbent material may be conducted in the manner described, as needed to achieve the differing level of PFAS adsorption, removal, or sequestration. After settling is complete, after one or more applications of adsorbent, where in alternative embodiments, the PFAS retained on the adsorbent material can be covered with a granular material such as sand, gravel, or soil mixtures; covered with a low permeability or impermeable material such as Aquablock®, clay, silt, or membrane material; or removed from the surface-water feature.

Before, during, or after the application adsorbent material to the surface water feature, water may be pumped into the surface water feature or pumped out of the surface water feature. Before, during, or after the application of adsorbent material to the surface water feature, water may flow by gravity into or out of the surface water feature as ground water, surface water, storm water, or other managed water stream. Water that flows into or out of the surface water feature may be natural pre-existing water flows, man-made water flows, or man-altered water flows. Water added to or removed from the surface water feature in this manner may facilitate the contact of adsorbent material and contaminated water to achieve remediation of the contaminated water. More than one surface water feature may be used to affect the treatment of contaminated water or the management of treated water.

Hence, after becoming contaminated, many real estate sites present significant human health, ecological, or redevelopment challenges due to extensive environmental contamination. In an effort to facilitate protection of human health and the environment, and to promote redevelopment of contaminated properties, the processes as described herein, have been developed to substantially advance remediation and redevelopment initiatives. These processes work by constructing a man-made surface-water feature, where an adsorbent material such as REMBIND is added to the water which adsorbs PFAS and remediates water contamination. This new water remediation method works to materially reduce adverse environmental impacts and human health and ecological risks by creating a man-made surface-water feature where remediation can be conducted. The invention offers numerous advantages over the prior art viz. it accelerates remediation and revitalization of properties so contaminated sites and ground water can again benefit the community and reduce PFAS exposures to humans and the environment.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A process for remediating contaminated ground water comprising the steps of:
   identifying a location of land-based contaminated ground water;
   excavating a void to expose the contaminated ground water;
   allowing the ground water to fill the void to create a surface-water feature; and
   adding an adsorbent chemical to the surface water feature to isolate contamination and providing treated water containing a lower concentration of contaminant compounds.

2. A process for remediating contaminated ground water as in claim 1, wherein the adsorbent material is at least one of activated carbon (AC), clay, metal oxide, biochar, proteins, cationic polymers, or organoclay.

3. A process for remediating contaminated ground water as in claim 1, wherein the adsorbent material settles to the bottom of the treatment lake.

4. A process for remediating contaminated ground water as in claim 1, further comprising the step of:
   adding material from the group of sand, silt, clay, gravel, stone, till, shale or synthetic material, to the surface water feature for isolating the contamination under the added material.

5. A process for remediating contaminated ground water as in claim 2, wherein the contamination are per- or polyfluoroalkyl substances (PFAS).

6. A process for remediating contaminated ground water as in claim 1, further comprising the step of:
   creating a secondary air-water interface to allow the direct diffusion of dissolved gasses between the water and atmosphere.

7. A ground water contamination remediation process as in claim 1, further comprising the step of:
   increasing the concentration of dissolved oxygen in the surface-water feature for reducing hydrogen sulfide or methane.

8. A ground water contamination remediation process as in claim 1, further comprising the step of:
    allowing treated water in the surface-water feature to flow out of the surface-water feature by the process of natural ground water flow.

9. A ground water contamination remediation process as in claim 1, further comprising the step of:
    using a pump to remove remaining contaminated ground water from the ground into the treatment lake.

10. A ground water contamination remediation process as in claim 1, further comprising the step of:
    pumping treated water out of the treatment lake.

11. A ground water contamination remediation process as in claim 1, further comprising:
    connecting the treatment lake to a natural body of water for allowing treated water to to flow out of the surface water feature.

12. A ground water contamination remediation process comprising the steps of:
    identifying a source and location of land-based ground water contamination;
    excavating the soil around the location of the contamination to create a void;
    exposing the contaminated ground water by excavating to a depth where the contaminated ground water is visible in the void;
    creating a man-made treatment lake by allowing the contaminated ground water to partially fill the void;
    adding an adsorbent chemical to the treatment lake; and
    mixing the adsorbent into the water for separating poly-fluoroalkyl substances (PFAS) in the contaminated water resulting in purified water in the treatment lake.

13. A ground water contamination remediation process as in claim 12, further comprising the step of:
    adding granular material from the group of sand, gravel, or soil mixtures for providing a covering with a low permeability or impermeable material from the group of clay, silt, or membrane material for isolating the PFAS under the added material, or removing from the surface-water feature and isolating the PFAS.

14. A ground water contamination remediation process as in claim 12, further comprising the step of:
    using a pump to remove remaining contaminated ground water from the ground into the treatment lake.

15. A ground water contamination remediation process as in claim 12, further comprising:
    connecting the treatment lake to a natural body of water for allowing treated water to to flow out of the treatment lake.

16. A ground water contamination remediation process comprising the steps of:
    identifying a source and location of land-based ground water contamination;
    excavating the soil above the location of the contamination to create a void;
    increasing the void to a predetermined size until the contaminated ground water is visible in the void;
    creating a man-made treatment lake by allowing the contaminated ground water to partially fill the void;
    aerating water in the treatment lake to reduce the amounts of hydrogen sulfide or methane in the contaminated water;
    adding an adsorbent material to the treatment lake;
    mixing the adsorbent material into the water for separating per- and poly-fluoroalkyl substances (PFAS) in the contaminated water resulting in purified water in the treatment lake; and
    adding a granular material to the treatment lake for isolating the PFAS under a granular material layer.

17. A ground water contamination remediation process as in claim 16, further comprising the step of:
    connecting the treatment lake to a natural body of water for allowing the purified water to mix and be used within the natural body of water.

\* \* \* \* \*